INVENTORS
MARCEL H.L. SÉDILLE AND
PAUL H. MÉNARD

INVENTORS
MARCEL H. L. SÉDILLE AND
PAUL H. MÉNARD

ATTORNEYS

Patented Apr. 15, 1952

2,592,749

UNITED STATES PATENT OFFICE 2,592,749

GAS TURBINE ENGINE ASSOCIATED WITH A GAS PRODUCER UNDER PRESSURE

Marcel H. L. Sédille, Paris, and Paul H. Ménard, Eaubonne, France, assignors to Societe Rateau (Societe Anonyme), Paris, France, a company of France, and René Anxionnaz, Paris, France, jointly Application November 13, 1947, Serial No. 785,772
In France January 16, 1947

7 Claims. (Cl. 60—39.12)

It is a known fact that combustible gases formed in a gas producer under pressure may be used directly for feeding the combustion chamber or chambers of a thermic engine including gas turbines, the pressure in the gas producer being substantially equal to that at the delivery end of the compressor of the gas turbine. The use of a gas producer shows moreover numerous advantages such as the possibility of using low grade coal, lignites, and the like and recovering by-products of considerable value such as tar, light fuel and the like. Lastly, the operation of a gas producer under pressure improves the grade of the combustible gas obtained and allows a reduction in bulk of the corresponding arrangement.

It is possible on the other hand to consider the feed of one or more combustion chambers of the gas turbine either with untreated gases from the gas producer under pressure or with such gases from which the recoverable by-products of a high commercial value have been previously removed.

The method forming the object of the invention consists in its principle in making the gas producer work at a pressure that is substantially higher than the delivery pressure of the compressor of the driving system including the gas turbine; for instance the pressure at the gas producer may range from 20 to 30 kgs. per sq. cm. as against a delivery pressure of 10 kgs. per sq.-cm. for the compressor of the driving system. This arrangement is associated with suitable means adapted to prevent the power required for the compression of the air blown into the gas producer from reducing too greatly the general efficiency of the arrangement. It is possible to improve thereby the efficiency of the gas producer and that of the gas turbine engine through a reduction in the size of the gas producer. Lastly, the arrangement disclosed allows executing a speedy adjustment of the power required at any moment for the arrangement as a whole.

The following description given out with reference to accompanying drawings is an exemplification that is by no means limitative of a form of execution of the invention, the features appearing either in the specification or in the drawings forming obviously part of the invention. In said drawings.

Figs. 3, 4, 5 and 6 relate to modifications in the arrangement according to the invention.

In a standard plant incorporating a gas turbine fed by a gas producer under pressure (Fig. 1) it is sufficient for the pressure in the gas producer to be slightly above that prevailing in the combustion chamber in order to make up for the losses of load in the pipes, in the gas producer and possibly in the apparatuses provided for recovering the by-products, that may, if required, be inserted at the output of the gas producer.

Figure 1:
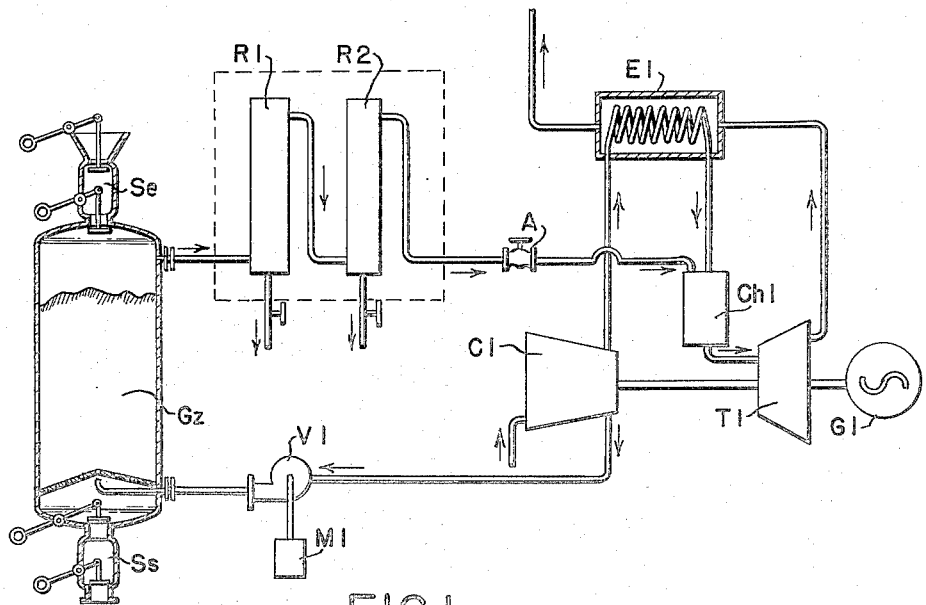
Fig. 1 illustrates diagrammatically a standard plant for the feeding of a gas turbine engine through a gas producer under pressure.

In Fig. 1 the driving system is illustrated diagrammatically as including an air compressor $C_l$, a heat exchanger $E_l$, the combustion chamber $Ch_l$ and the driving turbine $T_l$ that provides the power required for the drive of the air compressor $C_l$ and the useful power that is given up to the receiver $G_l$. The gas producer under pressure $Gz$ includes a first sluice $Se$ for the introduction of the fuel and a second sluice $Ss$ for the removal of the ashes. It is fed with air from the delivery end of the compressor $C_l$. The fan $V_l$ driven by a motor $M_l$ allows compensating the losses of head inside the pipe circuit and inside the gas producer. Possibly one or more recovering means $R_l$ and $R_2$ for by-products may be inserted at the output of the gas producer for recovering tar, light fuel and the like products having a commercial value. The combustible gases after purification or otherwise feed directly the combustion chamber $Ch_l$, the power developed being adjusted by the opening given to the valve $A$.

Figure 2:
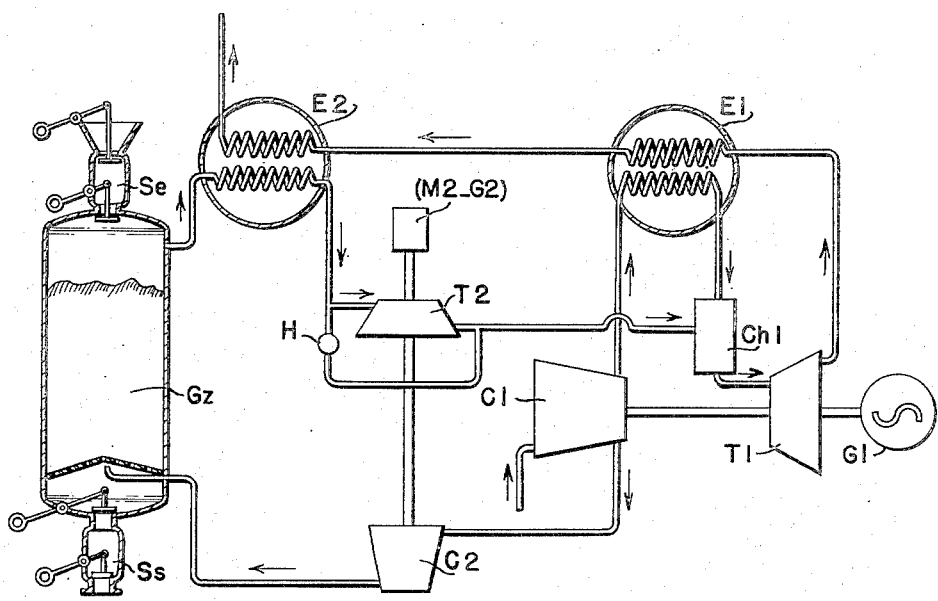
Figure 2 illustrates an arrangement according to the invention under its simplest form with a turbine and blower system ensuring an increase of pressure in the gas producer.

Fig. 2 illustrates diagrammatically a form of execution of the arrangement according to the invention; it differs from the diagram of Fig. 1 through the incorporation of an auxiliary group including the compressor $C_2$, the gas turbine $T_2$ and if required an auxiliary heat exchanger $E_2$. The compressor $C_2$ sucks in from the delivery end of $C_l$ the flow of air required for blowing into the gas producer $Gz$ and delivers it at a higher pressure in order to make said gas producer benefit by the increase in efficiency and reduction in bulk corresponding to this increase in pressure. The turbine $T_2$ transforms the expansion of the gases delivered by the gas producer down to the pressure of the combustion chamber $Ch_l$ into mechanical energy serving for the drive of the compressor $C_2$. Lastly and particularly in the case of the gases passing out of the gas producer being purified or cooled, a heat exchanger $E_2$ arranged in series or in parallel with the heat exchanger E1 provides for a preliminary heating of the gases feeding the turbine T2 through the exhaust gases from T1. The shafts of T2 and C2 are connected directly or indirectly with one another and transmit the excess energy produced by T2 to a generator G2 or else receive any possibly required supplement of energy from a motor M2 that is an electric motor for instance and is fed by the generator G1 driven by the turbine T1.

The heating of the gases before their admission into the turbine T2 shows the advantage of reducing inside the pipes and inside the expansion turbine the amounts of combustible material that may depose in case the by-products are not recovered. It allows moreover recovering more completely the remaining heat units contained inside the exhaust gases from the turbine T1 and increases consequently the efficiency of the plant.

Figure 3:
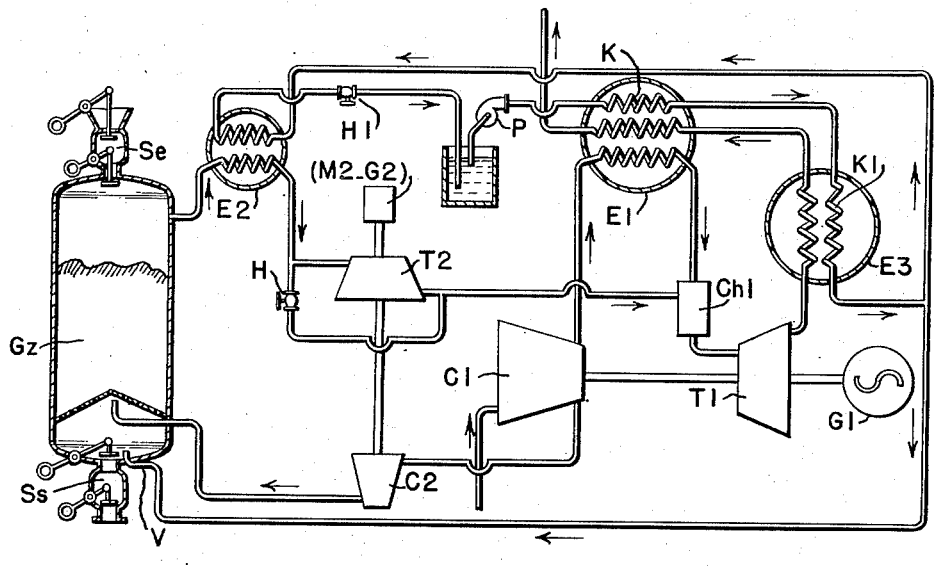

As the operation of the gas producer under pressure requires not only air for blowing purposes, but also steam, preferably superheated steam, it is possible to use for this purpose (Fig. 3) a boiler K with a superheater K1 located in the path of the exhaust gases from the turbine T1. The production of steam of said boiler may be used both for the injection of steam into the gas producer as shown at V in Fig. 3 and for heating the combustible gases inside the heat exchanger E2 before their admission into the turbine T2. Fig. 3 shows also a pump P adapted to feed the boiler K and a valve H1 forming expanding means inserted in the pipe returning the condensed water to the water feed container in order to keep the pressure in the steam circuit at the desired value.

Figure 4:
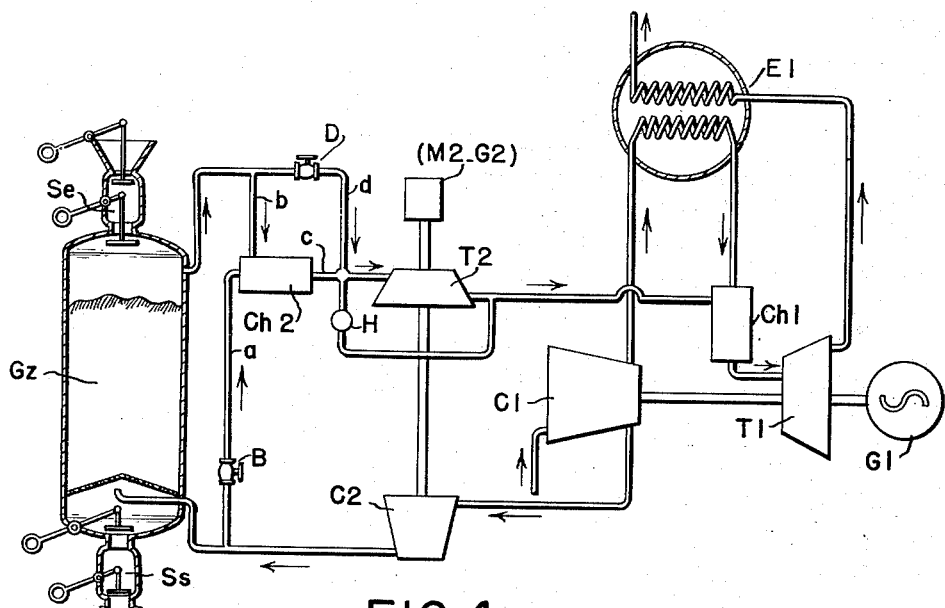

Fig. 4 is a modification of the arrangement according to the invention wherein the heat exchanger E2 is replaced by an auxiliary combustion chamber $Ch2$ specially designed for said purpose. As a matter of fact, the combustive air should be admitted in reduced amounts into it so as to allow the combustion only of a strictly limited fraction of the combustible gas. Fig. 4 shows a form of execution wherein the combustion chamber $Ch2$ receives simultaneously combustive air under pressure through the pipe $a$ and combustible gas through the pipe $b$ while it delivers through the pipe $c$ a mixture of burnt gases and combustible gas. The main flow of the burnt gases adapted to feed the group T1–C1 is obtained through the pipe $d$ and is heated through the admission of hot gases from the auxiliary combustion chamber through the pipe $c$. The adjustment of the air and of the combustible gases is performed through the gates or valves B and D.

Figure 5:
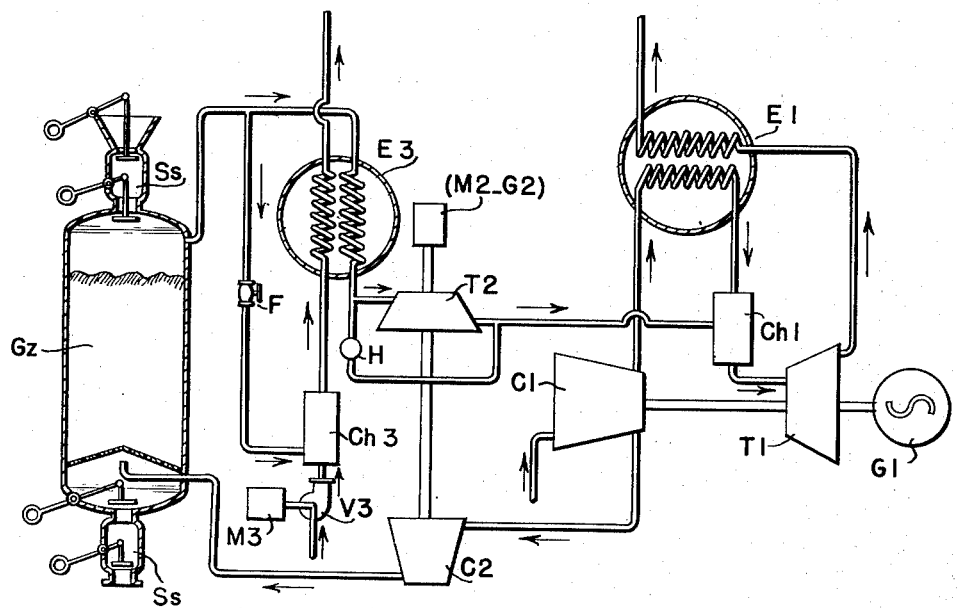

Lastly a different form of execution of the means for heating the combustible gases from the gas producer under pressure may include as shown in Fig. 5 a heat exchanger E3 receiving burnt gases from an auxiliary combustion chamber $Ch3$ wherein the combustion is performed at a pressure that is slightly above circumambient atmospheric pressure. The chamber $Ch3$ is fed then with combustive air through a motor and fan group M3–V3 and the combustible gases are fed to $Ch3$ through the agency of an expansion valve F. It is thus possible to avoid, as compared with the arrangement of Fig. 4, any loading with inert gases of the combustible gases feeding the main combustion chamber $Ch1$.

The principle of the above described arrangement is applicable without any limitation to any other forms or arrangements of the gas circuits feeding the main gas turbine T1, whatever may be the circuits and the cycle used, whether an open or semi-open circuit or a particular association used for the main turbine and compressor.

Figure 6:
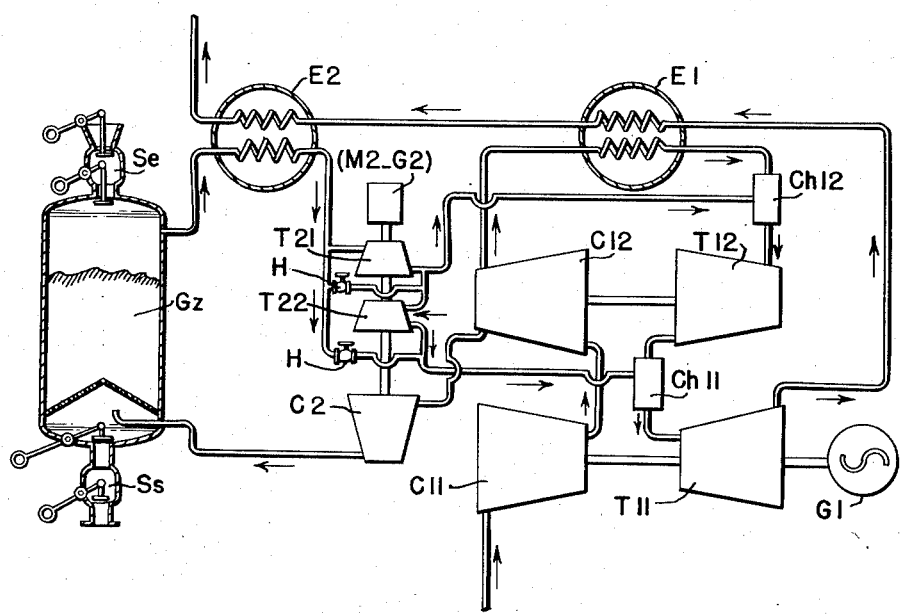

If there are several combustion chambers at different pressures for heating the driving gases during their expansion in the main turbine, there may be provided in the auxiliary turbine T2 tappings for expanded combustible gases from different stages as in the case of a steam turbine provided with tappings for instance. Fig. 6 illustrates a form of execution of such a type wherein the auxiliary turbine includes two stages in series $T2_1$ and $T2_2$ that are mechanically coupled. Combustible gases removed between the two stages feed the combustion chamber $Ch1_2$ that is located ahead of the high pressure turbine $T1_2$ of the principal driving cycle and the gases are removed from the output of the second stage $T2_2$ for feeding the combustion chamber $Ch1_1$ located ahead of the elementary low pressure turbine $T1_1$.

As concerns the adjustment of a driving group including a gas turbine according to the invention, the operation of the gas producer under a pressure that is higher than that of the main turbine shows the advantage of allowing a very rapid adjustment of the power by reason of the important amount of gases that accumulate under pressure inside the gas producer and the pipes connected thereto.

In a standard plant of known type such as that illustrated in Fig. 1 the adjustment of power should be operated with a view to reducing the power for instance by throttling through the valve A the admission of gases into the principal combustion chamber $Ch1$. This leads consequently to a lowering of the delivery pressure at the output of the main compressor C1 and thereby also of the pressure in the gas producer whereby, taking into account the capacity of the latter, the final rate of operation is established only after a comparatively long time. In the reverse case of an increase in power, it is necessary for the gas producer to be filled with gas at the new pressure to be considered in order to reach the new equilibrium in operation.

On the contrary, the adjustment of a plant according to the invention with a gas producer submitted to an important excess of pressure may be executed normally and rapidly by acting for instance on the speed of the auxiliary group T2–C2. It is thus possible to act on the motor or generator M2 or G2 if they may assume variable speeds or else to modify the admission of driving gases into the auxiliary turbine T2 by modifying the temperature of the gases through any known means or by controlling suitable valve systems at predetermined points of the gas circuit.

It is also possible to retain in the gas producer a constant pressure or else to provide a constant difference or ratio or the like predetermined law between the pressure in the gas producer and the high pressure level in the main circuit. In particular, it is possible to select a law of variation in pressure such that the speed of the gas in the gas producer may correspond to the most favorable rate of operation of the latter for all rates of operation of the main turbine. It is known for instance that for ensuring a satisfactory operation of the gas producer it is necessary to provide a certain speed of passage for the gases or else of the air and steam blown into the gas producer, If the load of the driving group is reduced, the fluid outputs would be reduced simultaneously and the reduction in speed thus arising may be corrected by reducing the pressure level in the gas producer for instance by slowing down the auxiliary group C2-T2. The perfect adaptation of the operative pressure in the gas producer depends moreover on other technicological factors such as the nature of the fuel that is being treated, its granulometric properties and the like.

But the chief advantage of an important overpressure in the gas producer consists in the possibility of forming an important immediately available provision of combustible gas in order to allow a corresponding increase in the power of the principal driving system while allowing a consequent momentary lowering of the overpressure inside the gas producer. It is sufficient therefore to provide a by-pass H across the auxiliary turbine T2 (Fig. 2) or across the stages T2₁ and T2₂ of said turbine (Fig. 6), said by-pass being opened in case of an important supply of power being required while means are provided in order that any deficiency in power for the auxiliary turbine may be compensated by an increase in energy in the motor M2 or a reduction in the power absorbed by the generator G2.

Lastly, it is possible, if the provision of combustible gas thus constituted is not sufficient, for instance for peak production, to insert in the circuit of the gas producer or producers or beyond the auxiliary turbine T2 supplementary capacities forming gas accumulators and allowing an increase in the amounts of combustible gas immediately available ahead of the combustion chamber or chambers of the main driving group.

In the following claims the words "combustion gas producer" are intended to designate an apparatus of the well known type wherein a combustible gas is generated from incomplete combustion of a carbonaceous fuel, in antithesis with other apparatus as pneumatic mills which produce by mechanical action fine powder of coal suspended in an air flow.

The invention only refers to gas turbine plants fed by the combustible gas issued from such a combustion gas producer, which puts in evidence a particular technical problem for the regulation of the plant and of the combustion in the producer according to the external load of the gas turbine.

The plant according to the invention which is a gas turbine plant proper is quite different from known plants wherein the useful external power is delivered by a steam turbine, with steam boiler heated by combustion of pneumatically pulverized coal and wherein gas turbines are only provided as auxiliary power means for generating the air under pressure required for the pulverization of coal by pneumatic action only.

What we claim is:

1. The combination with a gas turbine plant including an air compressor, a combustion chamber connected to the delivering side of said compressor so as to be fed with combustion air therefrom and a gas turbine connected to the exit of said combustion chamber so as to be fed with motive gases therefrom, of a combustible gas producing plant comprising a combustion gas producer adapted to operate and deliver combustible gas under a pressure much greater than that existing in said combustion chamber, a second air compressor the suction side of which is connected to the delivering side of the first-named compressor while its delivering side is connected to the air inlet of said gas producer so as to supercharge it, and a second gas turbine the inlet of which is connected to the gas delivering side of said gas producer while its exit is connected to said combustion chamber in order to feed said chamber with combustible gas, said second gas turbine being adapted to expand the combustible gas from the high pressure existing in said gas producer to the pressure in said combustion chamber.

2. The combination of claim 1 further comprising means for varying the rate of running of the said second air compressor according to the load of the gas turbine plant.

3. The combination of claim 1 further comprising electrical means combined with the said second gas turbine for varying the rate of running of the said second air compressor according to the load of the gas turbine plant.

4. The combination of claim 1 further comprising an auxiliary combustion chamber, pipe means tapped at the connection between the delivering side of said gas producer and the inlet of said second gas turbine, said pipe means leading into said auxiliary combustion chamber in order to burn therein only a part of the combustible gas issuing from said gas producer, and means arranged between said auxiliary combustion chamber and the inlet of said second gas turbine for transferring heat developed in said auxiliary combustion chamber to the combustible gas flowing towards said turbine.

5. The combination of claim 1 further comprising pipe means providing a by-pass for the combustible gas between the inlet and the outlet of the said second gas turbine and valve means on said by-pass for regulating the flow of the by-passed gas.

6. The combination of claim 1 further comprising steam producing and superheating means arranged in the path of the exhaust gases from the first-named gas turbine so as to be heated by the waste heat of said gases and pipe means connecting the steam exit of superheating means to said gas producer in order to inject superheated steam therein.

7. The combination with a gas turbine plant including an air compressor, a high pressure combustion chamber connected to the delivering side of said compressor so as to be fed with combustion air therefrom, a multi-stage gas turbine the high pressure stage of which is connected to the exit of said combustion chamber so as to be fed with motive gases therefrom and an intermediate mean pressure combustion chamber arranged in the path of the motive gases between two successive stages of said multi-stage gas turbine, of a combustible gas producing plant comprising a combustion gas producer adapted to operate and to deliver combustible gas under a pressure much greater than that existing in said high pressure combustion chamber, a second air compressor the suction side of which is connected to the delivering side of the first-named compressor while its delivering side is connected to the air inlet of said gas producer so as to supercharge it, a second multi-stage gas turbine the inlet of which is connected to the gas delivering side of said gas producer so as to be driven by the combustible gas from said gas producer, said multi-stage gas turbine being further adapted to expand said combustible gas from the high pressure existing in said gas producer up to the pressure prevailing in said mean pressure combustion chamber, pipe means connected to the exit of said multi-stage gas turbine and to said mean pressure combustion chamber, and other pipe means connected to said high pressure combustion chamber and to a point between two stages of said multi-stage gas turbine where the pressure of the combustible gas is equal to the pressure prevailing in said high pressure combustion chamber.

MARCEL H. L. SÉDILLE.
PAUL H. MÉNARD.

REFERENCES CITED

The following references are of record in the file of this patent:

UNITED STATES PATENTS

| Number | Name | Date |
|---|---|---|
| 991,179 | Stodola | May 2, 1911 |
| 2,055,385 | Noack | Sept. 22, 1936 |
| 2,225,311 | Lysholm | Dec. 17, 1940 |
| 2,496,407 | Pfenninger | Feb. 7, 1950 |